United States Patent
Abdulla et al.

(10) Patent No.: US 9,955,380 B2
(45) Date of Patent: Apr. 24, 2018

(54) METHOD AND SYSTEM FOR OPTIMIZING RADIO RESOURCES BETWEEN UE AND ENB DURING VOLTE CALL

(71) Applicant: Samsung Electronics Co., Ltd., Gyeonggi-do (KR)

(72) Inventors: Shaik Abdulla, Bangalore (IN); Ajay Kumar Kabadi, Bangalore (IN); Praveen Chebolu, Bangalore (IN); Varun Bharadwaj Santhebenur Vasudevamurthy, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 94 days.

(21) Appl. No.: 14/617,866

(22) Filed: Feb. 9, 2015

(65) Prior Publication Data
US 2015/0230129 A1    Aug. 13, 2015

(30) Foreign Application Priority Data
Feb. 7, 2014 (IN) .............................. 621/CHE/2014

(51) Int. Cl.
*H04W 28/06* (2009.01)
*H04L 29/06* (2006.01)

(52) U.S. Cl.
CPC ............ *H04W 28/06* (2013.01); *H04L 69/04* (2013.01)

(58) Field of Classification Search
None
See application file for complete search history.

(56) References Cited

U.S. PATENT DOCUMENTS

| | | | | |
|---|---|---|---|---|
| 2002/0097701 A1* | 7/2002 | Lupien | ............... | H04L 69/04 370/338 |
| 2005/0201366 A1* | 9/2005 | Kim | ............... | H04L 29/06027 370/353 |
| 2006/0104266 A1* | 5/2006 | Pelletier | ............... | H03M 7/30 370/389 |
| 2007/0165635 A1* | 7/2007 | Zhang | ............... | H04W 28/06 370/390 |
| 2009/0022107 A1* | 1/2009 | Kapoor | ............... | H04L 69/04 370/331 |
| 2010/0208798 A1* | 8/2010 | Melpignano | ............... | H04L 1/0014 375/240.07 |

(Continued)

OTHER PUBLICATIONS

Jonsson, L-E., Pelletier, G., "Robust Header Compression (ROHC): A Compression Profile for IP", Jun. 2004, RFC 3843, entire document.*

*Primary Examiner* — Suk Jin Kang (57) ABSTRACT

A method and system is provided for optimizing Radio resources during a VoLTE call when ROHC is enabled by indicating an IP-ID value using an identifier in an Initial and Refresh (IR) packet. During the VoLTE call, when value of a static IP-ID is zero, the ROHC compressor appends an identifier in the IR packet and enables the identifier for indicating the static IP-ID value to the ROHC decompressor. Further, the ROHC compressor sends the IR packet to the ROHC decompressor by enabling the identifier for indicating the static IP-ID value during the ROHC context. The ROHC decompressor receives the IR packet and determines the identifier in the IR packet. If the identifier is enabled in the IR packet then the ROHC decompressor sets the IP-ID value as zero during generation of decompressed IP header.

15 Claims, 6 Drawing Sheets

(56) References Cited

U.S. PATENT DOCUMENTS

| | | | |
|---|---|---|---|
| 2012/0076092 A1* | 3/2012 | Lu | H04L 69/04 370/329 |
| 2012/0106413 A1* | 5/2012 | Huang | H04L 1/0079 370/310 |
| 2012/0177064 A1* | 7/2012 | Shi | H04L 69/04 370/477 |
| 2012/0189023 A1* | 7/2012 | Huang | H04L 1/16 370/477 |
| 2013/0121345 A1* | 5/2013 | Zhang | H04W 28/06 370/465 |
| 2014/0169158 A1* | 6/2014 | Mishra | H04L 69/04 370/228 |
| 2014/0198809 A1* | 7/2014 | Shi | H04L 69/22 370/477 |
| 2016/0241624 A1* | 8/2016 | Uchino | H04W 36/06 |

* cited by examiner

METHOD AND SYSTEM FOR OPTIMIZING RADIO RESOURCES BETWEEN UE AND ENB DURING VOLTE CALL

PRIORITY

This application claims the priority under 35 U.S.C. § 119(a) to Indian Application Serial No. 621/CHE/2014, which was filed in the Indian Intellectual Property Office on Feb. 7, 2014, the entire contents of which are incorporated herein by reference.

TECHNICAL FIELD

The present disclosure relates to wireless communication systems and more particularly relates to a method and system for optimizing Radio resources between a User Equipment (UE) and an Evolved Node B (eNB) during a Voice over Long Term Evolution (VoLTE) call.

BACKGROUND

VoLTE (Voice over Long Term Evolution) is emerging as the preferred solution for the need to support real time voice traffic in IP networks.

The move towards all-IP and Voice over Internet Protocol (VoIP) in wireless access networks (such as, LTE)) will dramatically increase overhead due to headers. For example, VOIP is be carried by the Real-time Transport Protocol/User Datagram Protocol/Internet Protocol (RTP/UDP/IP) suite. Assuming a cellular codec encoding rate of 12.2 kbps (kilobits per second), there is a payload (voice packets) of 34 bytes and a header overhead of 40 bytes for RTP/UDP/IPv4 (in case of IP version four). This is an enormous overhead, and is clearly an unacceptable use of precious wireless bandwidth. This is especially true because, for VoIP, each User Equipment (UE) sends one RTP/UDP/IP frame every 20 ms (milliseconds). Further, these header fields do not change throughout the packet stream. Hence, these RTP/UDP/IP headers are compressed using a Robust Header Compression (ROHC) scheme, which is enabled by the network operator during the VoLTE call for compression of the header fields (which may otherwise lead to enormous overhead).

During the VoLTE call, the network can enable the ROHC scheme on all the voice packets sent by the UE. A ROHC compressor in the UE can compress the RTP/UDP/IP headers to minimum of 4 bytes of Header and sends to the ROHC decompressor (which is present at the receiver side in the UE).

In an existing system, during the VoLTE call, most of the Transport Control Protocol/Internet Protocol (TCP/IP) stacks (such as android TCP/IP stack or windows TCP/IP stack and the like) generate IP Identification (IP-ID) attribute in the IP header as zero. Further, the IP-ID is dependent on application type for generating IP-ID by TCP/IP stack. During the VoLTE call, the IP-ID is static with value zero. When the IP-ID is zero, the ROHC compressor sends the IP-ID uncompressed value. The IP-ID is generally two bytes and these two bytes of IP-ID is added to the compressed four bytes by the ROHC compressor. In the existing system, each time the ROHC compressor in the UE adds the IP-ID (without compression) to the compressed four bytes of packet data. Due to this, there is an overhead of two bytes of data for each ROHC compressed data (which is four bytes). This overhead of two bytes is consuming the precious bandwidth and the Radio resources between the UE and the Evolved Node B (eNB). In the existing system, there is no mechanism to indicate the static IP-ID (IP-ID with value zero) when a ROHC context is enabled.

SUMMARY

To address the above-discussed deficiencies, it is a primary object of the embodiments herein is to provide a method and system for optimizing the Radio resources between a User Equipment (UE) and an Evolved Node B (eNB) during a VoLTE call by indicating an IP-ID value using an identifier in an Initial and Refresh (IR) packet by a ROHC compressor for a ROHC context.

An embodiment of this disclosure provides a method for optimizing Radio resources between a User Equipment (UE) and an evolved Node B (eNB) during a Voice over Long Term Evolution (VoLTE) call by a User Equipment (UE). The method comprises appending an identifier in an Initial and Refresh (IR) packet by a Robust Header Compression (ROHC) compressor in the UE for indicating a static IP-ID to a ROHC decompressor during the VoLTE call. Further, the method comprises transmitting the IR packet to the eNB with the identifier for indicating a static IP-ID to the ROHC decompressor during an IR state by the ROHC compressor.

An embodiment of this disclosure provides a method for optimizing Radio resources between a User Equipment (UE) and an evolved Node B (eNB) during a Voice over Long Term Evolution (VoLTE) call by the UE. The method comprises receiving an IR packet from the eNB by a ROHC decompressor in the UE during a ROHC context. Further, the method comprises initializing value of an IP-ID as zero during generation of decompressed IP header by the ROHC decompressor when an identifier is enabled in the IR packet.

An embodiment of this disclosure provides a system for optimizing Radio resources between a User Equipment (UE) and an evolved Node B (eNB) during a Voice over Long Term Evolution (VoLTE) call. The system comprises a ROHC compressor, a ROHC decompressor. The ROHC compressor is configured to append an identifier in an Initial and Refresh (IR) packet for indicating a static IP-ID to a ROHC decompressor during the VoLTE call. Further, the ROHC compressor is configured to transmit the IR packet with the identifier for indicating a static IP-ID to the ROHC decompressor during an IR state. The ROHC decompressor receive an IR packet from the eNB during a ROHC context and initialize value of the IP-ID as zero during generation of decompressed IP header when an identifier is enabled in the IR packet.

An embodiment of this disclosure provides a User Equipment (UE) for optimizing Radio resources during a Voice over Long Term Evolution (VoLTE) call. The UE comprises a Robust Header Compression (ROHC) compressor along with an integrated circuit. Further the integrated circuit comprises a processor and a memory. The memory includes a computer program code within the integrated circuit. The memory and the computer program code with the processor cause the UE to append an identifier in an Initial and Refresh (IR) packet using a ROHC compressor for indicating a static IP-ID to a ROHC decompressor during the VoLTE call. Further, the UE is configured to transmit the IR packet to an evolved Node B (eNB) with the identifier for indicating a static IP-ID to the ROHC decompressor during an IR state by the ROHC compressor.

An embodiment of this disclosure provides a User Equipment (UE) for optimizing Radio resources during a Voice over Long Term Evolution (VoLTE) call. The UE comprises a Robust Header Compression (ROHC) compressor along with an integrated circuit. Further the integrated circuit comprises a processor and a memory. The memory includes a computer program code within the integrated circuit. The memory and the computer program code with the processor cause the UE to receive an IR packet from the eNB by the ROHC decompressor during a ROHC context and initialize value of IP-ID as zero during generation of decompressed IP header by the ROHC decompressor when an identifier is enabled in the IR packet.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for optimizing Radio resources between User Equipment (UE) and Evolved Node B (eNB) during a Voice over Long Term Evolution (VoLTE) call when a Robust Header Compression (ROHC) scheme is enabled by indicating an IP-ID value using an identifier in an Initial and Refresh (IR) packet by a ROHC compressor for a ROHC context.

During the VoLTE call, an audio engine or an audio application in a User Equipment (UE) generates audio packets for every 20 ms. These audio packets are standardized as Real-time Transport Protocol (RTP) packets in VoLTE domain. In general, during the VoLTE call, the TCP/IP layer constructs the IP/UDP/RTP headers and forwards the audio data to a ROHC compressor.

Further, during the VoLTE call, most of the TCP/IP stacks sends IP-Identification (IP-ID) value as zero. The IP-ID is an attribute in the IP header which remains static with value zero during the VoLTE call.

In an embodiment, when the IP-ID is static with value zero, the ROHC compressor appends an identifier in an Initial and Refresh (IR) packet and enables the identifier for indicating the static IP-ID value to a ROHC decompressor. Further, the ROHC compressor sends the IR packet to the ROHC decompressor with enabled identifier for indicating the static IP-ID value during the ROHC context.

In an embodiment, the ROHC decompressor can be configured to receive the IR packet and determines the identifier in the IR packet. If the identifier is enabled in the IR packet then the ROHC decompressor sets the IP-ID value as zero during generation of decompressed IP header.

The disclosed method and system is robust, simple and effective for optimizing the Radio resources between the UE and the eNB during the VoLTE call. Further, the method and system can save the bandwidth (approximately by 50%) for ROHC compressed header during the VoLTE call. When the ROHC context is enabled during the VoLTE call, the UE and the eNB can save two bytes of bandwidth, in which the compressed bytes can be sent in four bytes instead of six bytes as described in the conventional system. Furthermore, the proposed method and system can be readily implemented on the existing infrastructure and does not require extensive set-up or instrumentation to the existing infrastructure.

Referring now to the drawings and more particularly to FIGS. 1 through 6 where similar reference characters denote corresponding features consistently throughout the figures, there are shown preferred embodiments.

Figure 1:
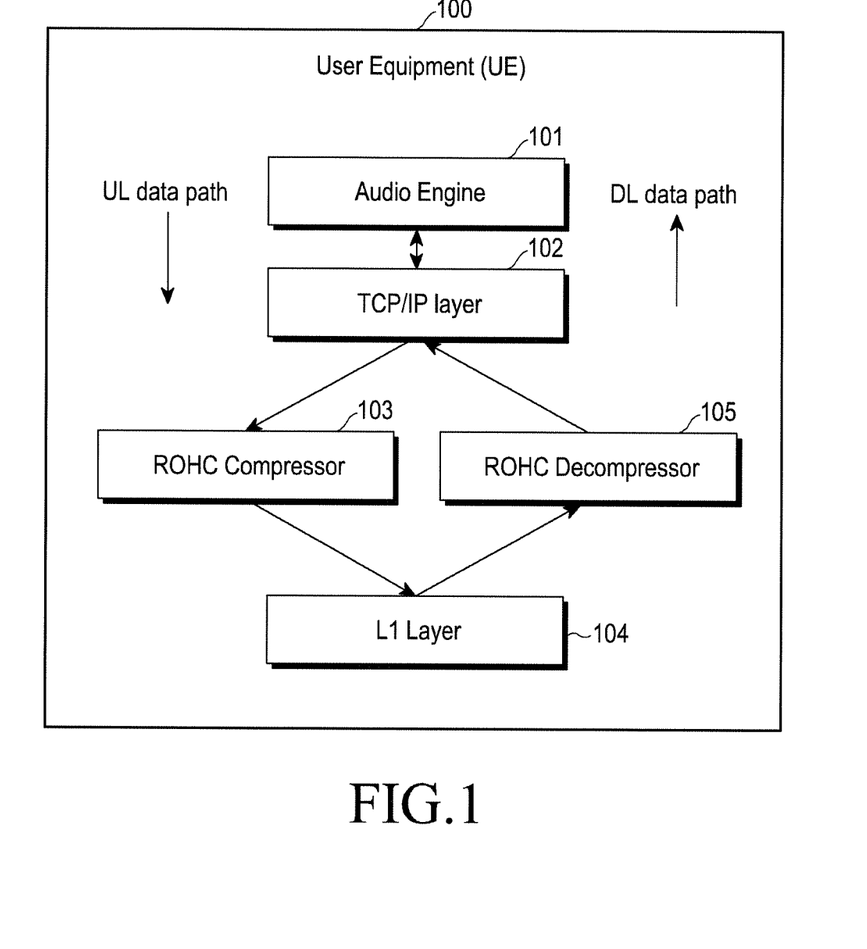
FIG. 1 illustrates a flow of audio packets in a User Equipment (UE) for a VoLTE call during uplink and downlink data paths, according to embodiments as disclosed herein.

FIG. 1 illustrates a flow of audio packets in a User Equipment (UE) for a VoLTE call during uplink and downlink data paths, according to embodiments as disclosed herein. As depicted in the FIG. 1, the UE 100 comprises an audio engine 101 in the application layer (not shown). The audio engine 101 is implemented as part of the application layer. The audio engine 101 is configured to send or receive the audio data (RTP packets) to or from a TCP/IP layer 102 during the VoLTE call.

In general, during the VoLTE call, the TCP/IP layer 102 generates the IP-ID as zero. Further, the TCP/IP layer 102 sends the IP-ID with value zero to a ROHC compressor 103. In an embodiment, when the ROHC compressor 103 receives the IP-ID as zero, the ROHC compressor 103 is configured to append an identifier in an Initial and Refresh (IR) packet. Further, the ROHC compressor 103 is configured to send the IR packet by enabling the identifier for indicating the static IP-ID value to a ROHC decompressor 105 during the ROHC context.

In an embodiment, the identifier in the IR packet can be enabled by initializing the identifier to one (1).

In an embodiment, the ROHC compressor 103 is configured to send the IR packet with enabled identifier to the eNB through a L1 layer 104 (as shown in the figure) during the ROHC context. When the static IP-ID value is indicated to the ROHC decompressor 105 using the enabled identifier, the ROHC compressor 103 ignores the IP-ID value as a part of every compressed packet which is sent to the ROHC decompressor through the eNB.

In a Downlink (DL) data path, the ROHC decompressor 105 is configured to receive the IR packet from the eNB through the L1 Layer 104. When the ROHC decompressor 105 receives the IR packet, the ROHC decompressor 105 is configured to determine the identifier in the IR packet. If the ROHC decompressor 105 determines that the identifier is enabled in the IR packet, then the ROHC decompressor 105 is configured to set the IP-ID as zero during the generation of decompressed IP header.

Figure 2:
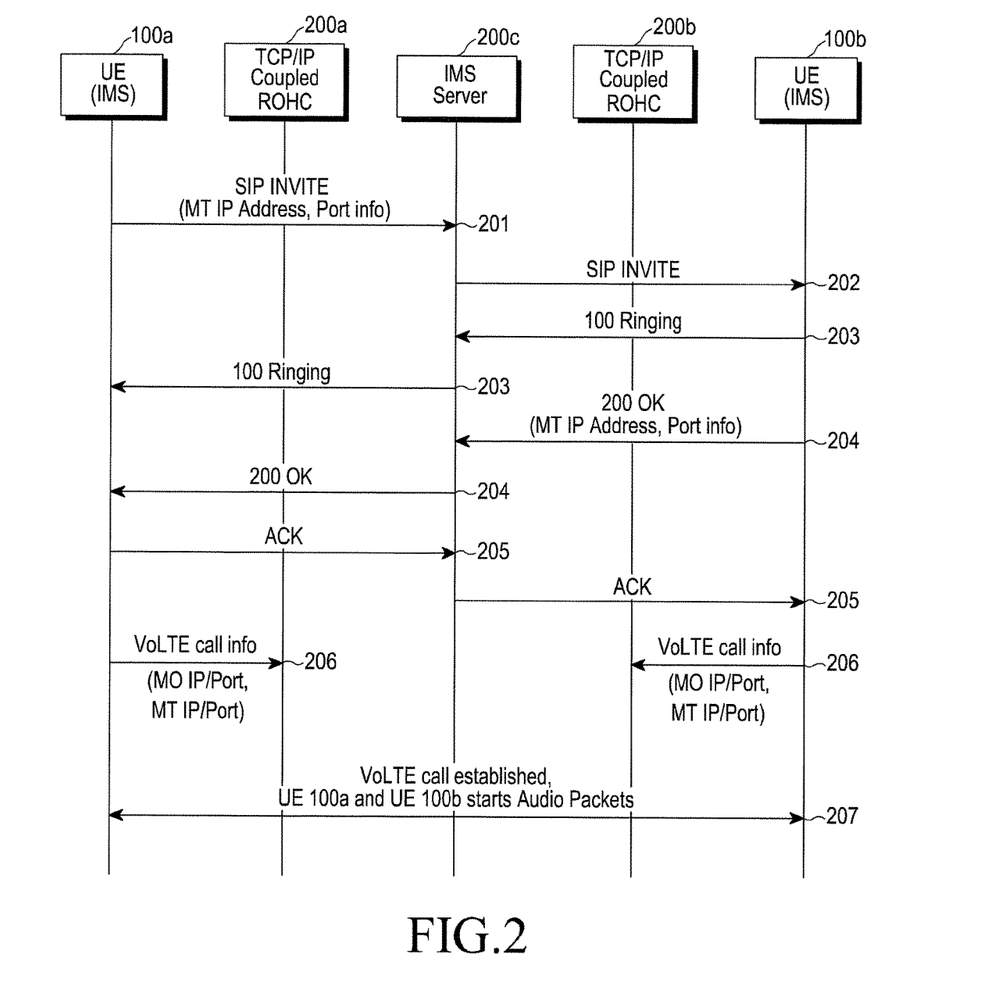
FIG. 2 is a sequence diagram illustrating the VoLTE call establishment procedure.

FIG. 2 is a sequence diagram illustrating the VoLTE call establishment procedure. The VoLTE call establishment procedure between a UE 100a and a UE 100b with IP Multimedia Subsystem (IMS) capability is depicted in the sequence diagram.

The UE 100a initiates the VoLTE call (Mobile originating (MO) call) with the UE 100b (Mobile Terminating (MT) call). Initially, the UE 100a sends (201) a Session Initiation Protocol (SIP) INVITE message with MO IP Address and Port information to an IMS server 200c.

Further, the IMS server 200c receives the SIP INVITE message from the UE 100a and forwards (202) the SIP INVITE message to the UE 100b. In response to the SIP INVITE MESSAGE from the IMS server 200c, the UE 100b sends (203) '100 Ringing' message to the IMS server 200c.

The IMS server 200c receives the '100 Ringing' message and forwards (203) to the UE 100a. Further, the UE 100b sends (204) "200 OK" message with MT IP Address and Port information to the IMS server 200c.

Further, the IMS server 200c forwards (204) the "200 OK" message to the UE 100a. The UE 100a sends (205) an ACK (acknowledge) message to the IMS server 200c and this ACK message is forwarded (205) to the UE 100b through the IMS server 200c.

Further, the UE 100a sends (206) the properties of VoLTE call (VoLTE call information) that comprises MO IP Address and Port, MT IP Address and Port to the TCP/IP coupled ROHC 200a.

Similarly, the UE 100b sends (206) the properties of VoLTE call (VoLTE call information) that comprises MO IP Address and Port, MT IP Address and Port to the TCP/IP coupled ROHC 200b. Once the UE 100a and UE 100b share the IP Address and Port information with their corresponding TCP/IP coupled ROHCs, the VoLTE call is established between the UE 100a and the UE 100b. The UE 100a and UE 100b start the exchange of audio packets when the VoLTE call is established.

Figure 3:
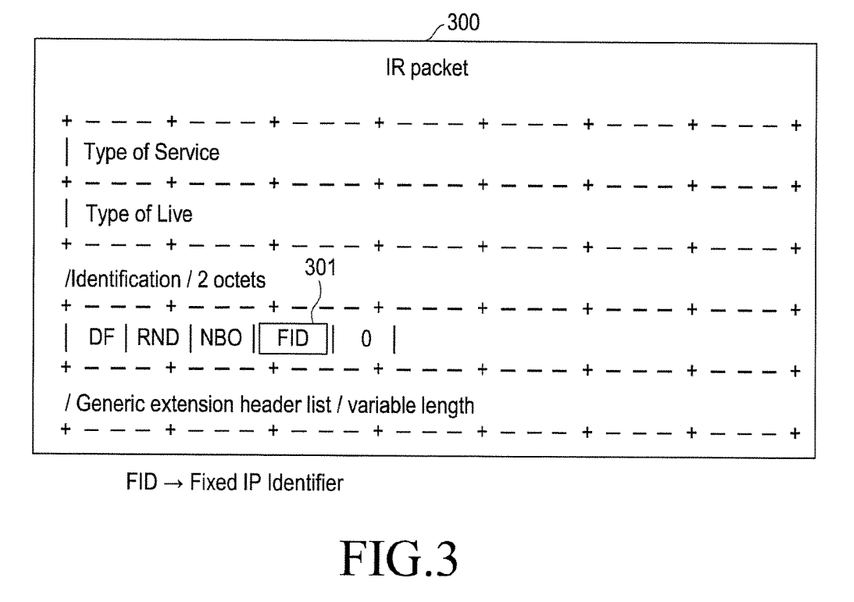
FIG. 3 illustrates an Initial and Refresh (IR) packet with an identifier for indicating static IP-ID during the VoLTE call, according to the embodiments as disclosed herein.

FIG. 3 illustrates an Initial and Refresh (IR) packet with an identifier for indicating static IP-ID during the VoLTE call, according to the embodiments as disclosed herein. In an embodiment, the ROHC compressor 103 is configured to send an IR packet 300 to the ROHC decompressor during an IR state for establishing the ROHC context with the ROHC decompressor 105. The IR packet 300 comprises a Fixed IP Identifier (FID) 301 for indicating the static IP-ID during the during the ROHC context. The ROHC compressor 103 is configured to enable the FID 301 in the IR packet when the IP-ID is static (with value zero) during the VoLTE call. In an example, the FID 301 is set to value one (1) for enabling the FID in the IR packet 300. The FID is disabled in the IR packet by initializing the FID to zero (0) when the IP-ID behavior is sequential, sequential-swapped or random.

When the FID 301 is set to one in the IR packet 300 by the ROHC compressor 103, it indicates to the ROHC decompressor 105 that the IP-ID is static with value zero during the ROHC context.

In an embodiment, the ROHC compressor is configured to disable the FID 301 when the IP-ID behavior is sequential, sequential-swapped or random.

Figure 4:
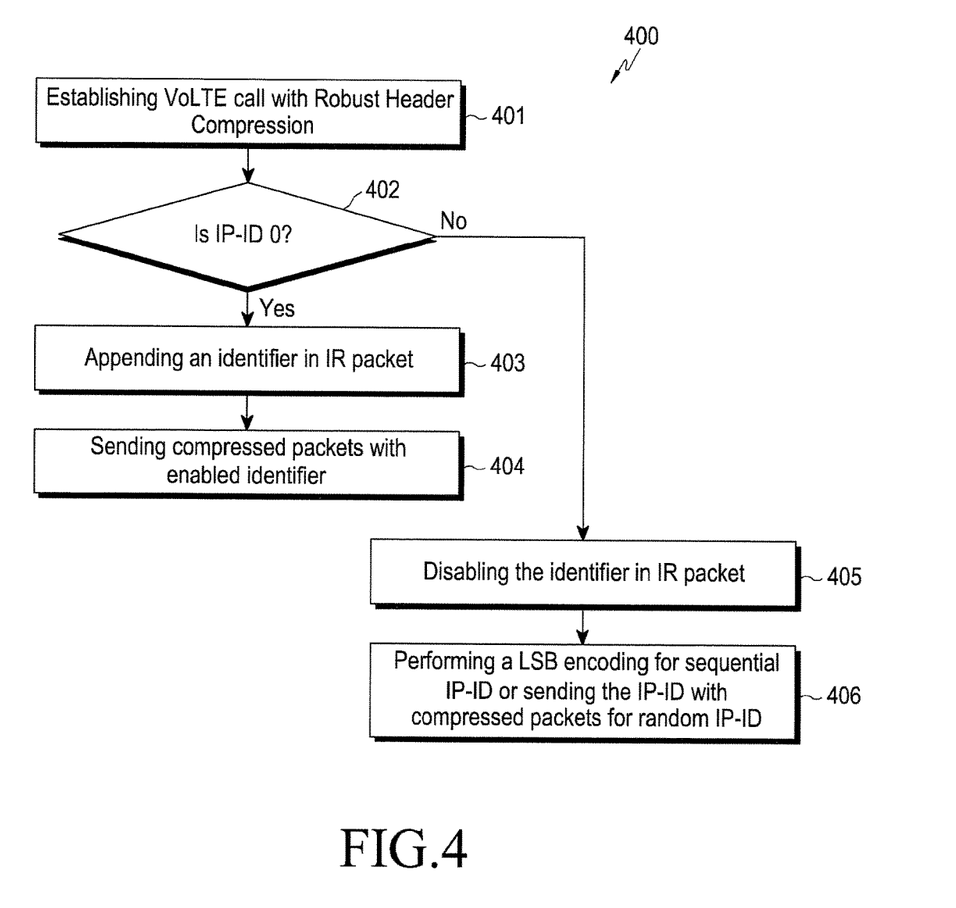
FIG. 4 is a flow diagram illustrating a method for indicating static IP-ID to ROHC decompressor during the VoLTE call by a ROHC compressor, according to the embodiments as disclosed herein.

FIG. 4 is a flow diagram illustrating a method 400 for indicating static IP-ID to ROHC decompressor during VoLTE call by a ROHC compressor according to the embodiments as disclosed herein. At operation 401, the method 400 includes establishing a VoLTE call by a UE with ROHC compression. The method 400 allows the UE 100 to establish the VoLTE call by enabling the ROHC compression through the ROHC compressor 103 in the UE 100. At operation 402, the method 400 includes determining whether the IP-ID attribute is zero during the VoLTE call by the UE 100. The method 400 allows the ROHC compressor 103 to determine whether the value of the IP-ID is zero during the VoLTE call. If it is determined at operation 402, that the value of the IP-ID is zero, then at operation 403, the method 400 includes appending an identifier in an IR packet. The method 400 allows the ROHC compressor 103 to append the identifier in the IR packet. For example, the ROHC compressor 103 appends the FID identifier in the IR packet. At operation 404, the method 400 includes sending compressed packets with enabled identifier in the IR packet. The method 400 allows the ROHC compressor 103 to send the compressed packets by enabling the identifier. For example, the ROHC compressor 103 sends the compressed packets by the enabling value of the FID to zero or one.

If at operation 402, it is determined that the IP-ID is non-zero then at operation 405, the method 400 includes disabling the identifier in the IR packet. The method 400 allows the ROHC compressor to disable the identifier in the IR packet. Further, at operation 406, the method 400 includes performing a Least Significant Bit (LSB) encoding for sequential IP-ID or the method 400 includes sending the IP-ID with compressed packets for random IP-ID. The method 400 allows the ROHC compressor 103 to perform the LSB encoding for sequential IP-ID. Further, the method 400 allows the ROHC compressor 103 to send the IP-ID with compressed packets when the IP-ID is random. Further, the various actions, units, operations, blocks, or acts described in the method 400 can be performed in the order presented, in a different order, simultaneously, or a combination thereof. Furthermore, in some embodiments, some of the actions, units, operations, blocks, or acts listed in the FIG. 4 may be omitted.

Figure 5:
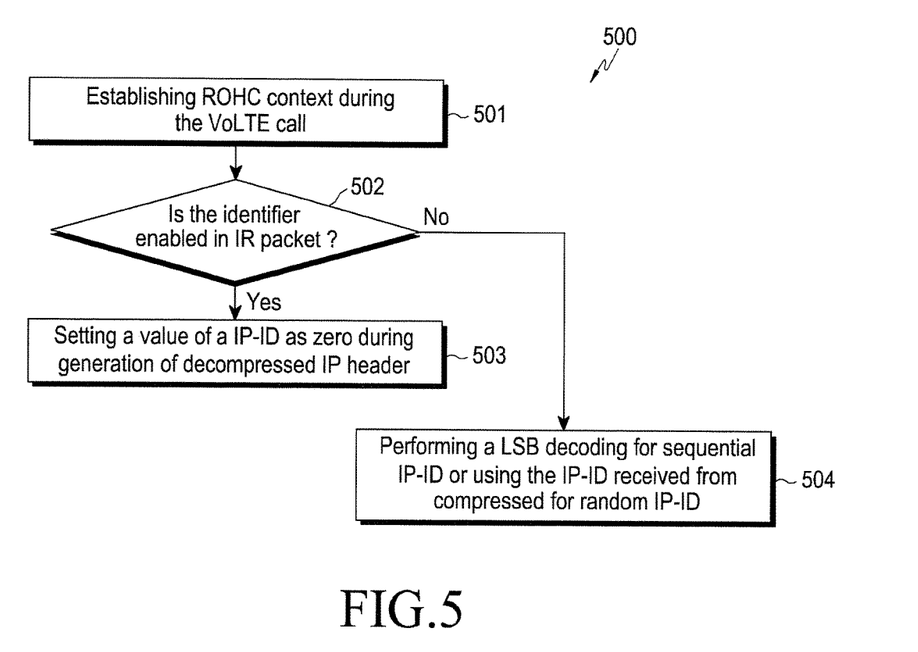
FIG. 5 is a flow diagram illustrating a method executed by a ROHC decompressor during the ROHC context, according to the embodiments as disclosed herein.

FIG. 5 is a flow diagram illustrating a method 500 executed by a ROHC decompressor during the ROHC context, according to the embodiments as disclosed herein. At operation 501, the method 500 includes establishing a ROHC context during the VoLTE call. The method 500 allows the ROHC decompressor 105 to establish the ROHC context during the VoLTE call. At operation 502, the method 500 includes determining whether the identifier is enabled in the IR packet. The method 500 allows the ROHC decompressor 105 to determine whether the identifier is enabled in the IR packet. If at operation 502, it is determined that the identifier is enabled in the IR packet, then at operation 503, the method 500 includes setting a value of the IP-ID as zero during generation of decompressed IP header. The method 500 allows the ROHC decompressor to set the value of the IP-ID as zero during generation of decompressed IP header.

If at operation 502, it is determined that identifier is not enabled in the IR packet then the method 500 includes performing a LSB decoding for sequential IP-ID or the method 500 includes using the IP-ID received from the ROHC compressor when the IP-ID is random. The method 500 allows the ROHC decompressor 105 to perform the LSB decoding for sequential IP-ID. If the IP-ID is random, then the method 500 allows the ROHC decompressor 105 to use the IP-ID received from the ROHC compressor 103. Further, the various actions, units, operations, blocks, or acts described in the method 500 can be performed in the order presented, in a different order, simultaneously, or a combination thereof. Furthermore, in some embodiments, some of the actions, units, operations, blocks, or acts listed in the FIG. 5 may be omitted.

Figure 6:
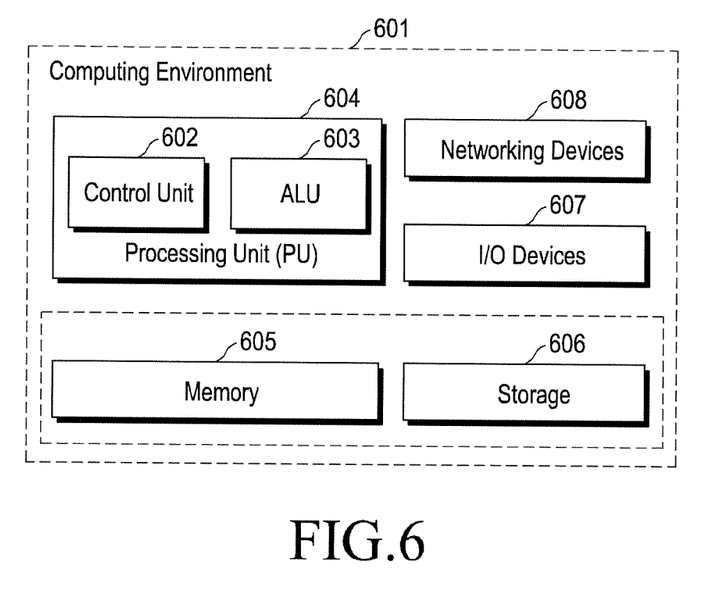
FIG. 6 illustrates a computing environment implementing the method and system for optimizing Radio resources between UE and eNB during the VoLTE, according to the embodiments as disclosed herein.

FIG. 6 illustrates a computing environment implementing the method and system for optimizing Radio resources between UE and eNB during VoLTE, according to the embodiments as disclosed herein. As depicted the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple CPUs of different kinds, special media and other accelerators. The processing unit 604 is responsible for processing the instructions of the algorithm. Further, the plurality of processing units 604 may be located on a single chip or over multiple chips.

The algorithm comprising of instructions and codes used for the implementation are stored in either the memory unit 605 or the storage 606 or both. At the time of execution, the instructions may be fetched from the corresponding memory 605 and/or storage 606, and executed by the processing unit 604.

In case of any hardware implementations various networking devices 608 or external I/O devices 607 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, and 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for optimizing radio resources between a user equipment (UE) and an evolved Node B (eNB) during a voice over long term evolution (VoLTE) call by the UE, the method comprises:
   determining whether a value of an internet protocol-identification (IP-ID) is a static value during the VoLTE call;
   enabling an identifier appended in an initial and refresh (IR) packet by a robust header compression (ROHC) compressor when the value of the IP-ID is the static value that is set to a predetermined constant, wherein the identifier appended in the IR packet indicates whether the value of the IP-ID is the static value to an ROHC decompressor in another UE; and
   transmitting, to the eNB, the IR packet with the identifier during an IR state of the ROHC compressor, wherein the IP-ID is not transmitted to the eNB when the IP-ID is the static value during the VoLTE call.

2. The method of claim 1, wherein determining whether the value of the IP-ID is the static value during VoLTE call comprises determining that the value of the IP-ID is not a static value, when a value of the static IP-ID is not set to zero during the VoLTE call.

3. The method of claim 2, further comprising performing a least significant bit (LSB) encoding for the IP-ID when the value of the IP-ID is not a static value.

4. The method of claim 2, further comprising transmitting, to the eNB, the IR packet with the identifier for indicating that the value of the IP-ID is not a static value, to the ROHC decompressor in another UE, during an IR state of the ROHC compressor.

5. A method for optimizing radio resources between a user equipment (UE) and a evolved Node B (eNB) during a voice over long term evolution (VoLTE) call by the UE, the method comprises:

receiving, from the eNB, an initial and refresh (IR) packet with an identifier during a robust header compression (ROHC) context by an ROHC decompressor, wherein the identifier indicates whether a value of an internet protocol-identification (IP-ID) is a static value;

determining whether the identifier is enabled in the IR packet based on a value of the identifier; and initializing the value of the IP-ID as a predetermined constant during generation of decompressed IP header by the ROHC decompressor, when the identifier is enabled in the IR packet, wherein the IP-ID is not received when the IP-ID is the static value during the VoLTE call.

6. A user equipment (UE) for optimizing radio resources between the UE and a evolved Node B (eNB) during a voice over long term evolution (VoLTE) call, the UE comprising:
a robust header compression (ROHC) compressor;
an ROHC decompressor; and
at least one processor configured to:
determine whether a value of an internet protocol-identification (IP-ID) is a static value during the VoLTE call;
control the ROHC compressor to enable a first identifier appended in a first initial and refresh (IR) packet when the value of the IP-ID is the static value, wherein the first identifier appended in the first IR packet indicates whether the value of the IP-ID is the static value to an ROHC decompressor in another UE;
control the ROHC compressor to transmit, to the eNB, the first IR packet with the first identifier during an IR state;
receive, from the eNB, a second IR packet with a second identifier during an ROHC context through the ROHC decompressor;
determine whether the second identifier is enabled in the second IR packet based on a value of the second identifier; and
control the ROHC decompressor to initialize the value of the IP-ID as a predetermined constant during generation of decompressed IP header when the second identifier is enabled in the second IR packet, wherein the IP-ID is not transmitted to the eNB when the IP-ID is the static value during the VoLTE call.

7. The UE of claim 6, wherein the at least one processor is further configured to determine that the value of the IP-ID is a static value when the value of the static IP-ID is set to a zero during the VoLTE call.

8. The UE of claim 6, wherein the at least one processor is further configured to determine that the value of the IP-ID is not a static value when the value of the static IP-ID is not set to a zero during the VoLTE call.

9. The UE of claim 8, wherein the at least one processor is further configured to perform a least significant bit (LSB) encoding for the IP-ID when the value of the IP-ID is not a static value.

10. The UE of claim 8, wherein the at least one processor is further configured to transmit the IR packet with an identifier for indicating that the value of the IP-ID is not a static value, to the ROHC decompressor in another UE, during an IR state of the ROHC compressor.

11. A user equipment (UE) for optimizing radio resources during a voice over long term evolution (VoLTE) call, the UE comprising a robust header compression (ROHC) compressor operably connected to:
an integrated circuit comprising at least one processor; and
at least one memory storing a computer program code within the integrated circuit, wherein the at least one processor operably connected to the at least one memory cause the UE to:
determine whether a value of an internet protocol-identification (IP-ID) is a static value during the VoLTE call;
enable an identifier appended in an initial and refresh (IR) packet by the ROHC compressor when the value of the IP-ID is the static value, wherein the identifier appended in the IR packet indicates whether the value of the IP-ID is the static value to an ROHC decompressor in another UE; and
transmit, to an evolved Node B (eNB), the IR packet with the identifier during an IR state of the ROHC compressor, wherein the IP-ID is not transmitted to the eNB when the IP-ID is the static value during the VoLTE call.

12. The UE of claim 11, wherein the at least one processor operably connected to the at least one memory cause the UE to determine that the value of the IP-ID is not a static value when the value of the static IP-ID is not set to a zero during the VoLTE call.

13. The UE of claim 12, wherein the at least one processor operably connected to the at least one memory cause the UE to perform a least significant bit (LSB) encoding for the IP-ID when the value of the IP-ID is not a static value.

14. The UE of claim 12, wherein the at least one processor operably connected to the at least one memory cause the UE to transmit, to the eNB, the IR packet with the identifier for indicating that the value of the IP-ID is not a static value, to the ROHC decompressor in another UE, during an IR state of the ROHC compressor.

15. A user equipment (UE) for optimizing radio resources during a voice over long term evolution (VoLTE) call, the UE comprising an ROHC decompressor operably connected to:
an integrated circuit comprising at least one processor; and
at least one memory storing a computer program code within the integrated circuit, wherein the at least one processor operably connected to the at least one memory cause the UE to:
receive, from the eNB, an initial and refresh (IR) packet with an identifier during an ROHC context by an ROHC decompressor, wherein the identifier indicates whether a value of an internet protocol-identification (IP-ID) is a static value;
determine whether the identifier is enabled in the IR packet based on a value of the identifier; and
initialize the value of the IP-ID as a predetermined constant during generation of decompressed IP header by the ROHC decompressor when the identifier is enabled in the IR packet, wherein the IP-ID is not received when the IP-ID is the static value during the VoLTE call.

* * * * *